US 6,950,807 B2

(12) United States Patent
Brock

(10) Patent No.: US 6,950,807 B2
(45) Date of Patent: Sep. 27, 2005

(54) SYSTEM AND METHOD FOR PROVIDING FINANCING

(75) Inventor: Jeffrey Michael Brock, Commerce Township, MI (US)

(73) Assignee: Credit Acceptance Corporation, Southfield, MI (US)

(*) Notice: Subject to any disclaimer, the term of this patent is extended or adjusted under 35 U.S.C. 154(b) by 566 days.

(21) Appl. No.: 10/037,055

(22) Filed: Dec. 31, 2001

(65) Prior Publication Data

US 2003/0126072 A1 Jul. 3, 2003

(51) Int. Cl.[7] ............................................. G06F 17/60
(52) U.S. Cl. ................................... 705/38; 705/35
(58) Field of Search ............................. 705/38, 39, 40, 705/35

(56) References Cited

U.S. PATENT DOCUMENTS

| 5,774,883 | A | * | 6/1998 | Andersen et al. | ............. 705/38 |
| 2001/0049653 | A1 | * | 12/2001 | Sheets | ......................... 705/38 |
| 2002/0065753 | A1 | * | 5/2002 | Schloss et al. | ................ 705/35 |
| 2003/0216995 | A1 | * | 11/2003 | DePauw et al. | .............. 705/37 |

FOREIGN PATENT DOCUMENTS

JP 02003141382 A * 5/2003

OTHER PUBLICATIONS

John A BUzacott, Rachel Q. Zhang. management science. linthicum: Sep. 2004. vol. 50, Iss. 9; p. 1274.*

* cited by examiner

*Primary Examiner*—Lynda C. Jasmin
*Assistant Examiner*—Ronald Laneau
(74) *Attorney, Agent, or Firm*—Bell, Boyd & Lloyd LLC

(57) ABSTRACT

A method of providing financing is provided. The method provides financing for allowing a customer to purchase a product selected from an inventory of products maintained by a dealer. The method includes the steps of maintaining a database of the dealer's inventory, gathering information from the customer, calculating a credit score for the customer based at least in part on the information gathered from the customer, determining an advance amount to be paid to the dealer for each individual product in the dealer inventory in the event that that particular product is sold to the customer, calculating a front-end profit to be realized by the dealer for each individual product in the dealer inventory, and presenting a financing package to the dealer for each individual product in the dealer's inventory.

42 Claims, 9 Drawing Sheets

Vehicle Entry Form

Please enter the Stock #, Vin #, Purchase Date, Color and Mileage then click the "Continue to Add" Button.

Stock #

VIN

Purchase Date    MMDDYYYY

Color    Beige ▽

Mileage

[Continue to Add]    [Clear Page]

Vehicle Entry Form

140

Please make any necessary changes and then click the "UpdateVehicle Info" Button Stock # BK0 —142    Year 2001    Make TOYOTA  Model CAMERY

VIN 4T1BG22K81U765204 —144

Purchase Date 03-JUL-2001    Color White ▽ —148    Mileage 12096 —150

146—
| Available ▽ |
| Available |
| Delete |
| Financed |
| Leased |
| Sold for Cash |
| Wholesaled |

Reset    Update Vehicle Info

FIG. 3

VehicleInventory

| Stock # | Days in stock | Year | Make | Model | Color | Miles | Retail Clean | Retail Avg. | Whol. Clean | Whol. Avg. | Whol. Rough | Cost | Selling Price |
|---|---|---|---|---|---|---|---|---|---|---|---|---|---|
| PBZN1118 | 36 | 2001 | DODGE | INTREPID | Beige | 35,307 | $14,150 | $12,750 | $11,325 | $10,250 | $9,200 | $10,741.63 | $15,275 |
| PBZN1129 | 36 | 2001 | DODGE | NEON | Beige | 17,685 | $11,750 | $10,525 | $9,350 | $8,500 | $7,500 | $6,975.00 | $11,750 |
| 11197UZ | 36 | 2001 | FORD | ESCORT | Beige | 19,945 | $9,450 | $8,550 | $7,125 | $6,525 | $5,750 | $6,821.92 | $11,175 |
| PBZN11043 | 36 | 2001 | FORD | ESCORT | Beige | 29,143 | $10,925 | $10,075 | $8,600 | $8,050 | $7,350 | $8,167.57 | $11,125 |
| PBZ1026 | 36 | 2001 | FORD | FOCUS | Beige | 29,704 | $11,425 | $10,350 | $9,000 | $8,300 | $7,550 | $9,384.72 | $11,925 |
| T358A | 87 | 1996 | Chevrolet | S10 | Black | 58,861 | $8,075 | $6,675 | $5,975 | $4,950 | $3,300 | $6,685.00 | $9,200 |
| 9454 | 92 | 1996 | Chrysler | CIRRUS | Beige | 85,336 | $7,350 | $5,925 | $5,225 | $4,225 | $3,375 | $5,370.00 | $8,925 |
| 2961 | 53 | 1996 | DODGE | INTREPID | Orange | 87,009 | $6,225 | $4,625 | $4,050 | $2,900 | $1,950 | $3,285.00 | $6,195 |
| B9893RP | 52 | 1996 | EAGLE | TALON | Purple | 90,373 | $7,725 | $6,275 | $5,625 | $4,625 | $3,400 | $4,870.01 | $8,250 |
| A1200 | 8 | 1996 | FORD | Light Duty | Red | 95,000 | $11,650 | $10,225 | $8,975 | $7,925 | $7,200 | $5,300.00 | $10,225 |
| XX1 | 163 | 1996 | FORD | TAURUS | Beige | 81,000 | $6,300 | $4,950 | $4,200 | $3,250 | $2,400 | $3,984.00 | $7,400 |

Sort By: Yr/Make/Model ▽
- Cost
- Days in Stock
- Selling Price
- Yr/Make/Model

Order: Descending ▽   Go

FIG. 4

Please enter the following Maker information and then click the "Continue" Button.

Enter Maker Information — 200

- 202 — SSN
- 204 — DOB
- 206 — Last Name
- 208 — First Name
- 210 — MI
- 212 — Street Number
- 214 — Street Name
- 216 — Street Type
- 218 — Apt. Number
- 220 — P.O. Box
- 222 — City
- 224 — Michigan / State
- 226 — Zip
- 228 — Home Phone
- Alternate Phone
- NO — Is this a message phone?
- 230 — Email address: username@domain.com

- 232 — Salesperson: ATANASOVSKI, STEVE
- 236 — Enter time at Curr. Address: 0
- 238 — 0
- 240 — Residency Status: Owns
- 242 — Rent/Morgage Pmt
- 244 — Cash Down Pmt: $.00
- 246 — Gross Trade-In Value
- 248 — Payoff for Trade-In
- 250 — Net Trade-In
- 252 — Total Down Pmt Continue

FIG. 5

| 302 | 304 | 306 | 308 | 310 | 312 | 314 | 316 | 318 | 320 | 322 | 324 | 326 | 330 |
|---|---|---|---|---|---|---|---|---|---|---|---|---|---|
| CAV | 16 | 1996 | Cavalier | Blue | $5625.00 | 53.3% | $1820.81 | $3200.00 | $1569.31 | $180.77 | $211.17 | 24 | ○ |
| A1202 | 13 | 1996 | Cherokee | Red | $8775.00 | 34.2% | $4144.29 | $4250.00 | $2653.79 | $1088.59 | $267.60 | 39 | ○ |
| B9895GT | 57 | 1996 | Cherokee | Blue | $11950.00 | 25.1% | $6775.74 | $7070.01 | $1274.73 | $1914.30 | $353.71 | 45 | ○ |
| 9454 | 97 | 1996 | Cirrus | Beige | $8925.00 | 33.6% | $3021.66 | $6370.00 | $754.97 | $1839.77 | $289.04 | 36 | ○ |
| AX2 | 55 | 1996 | Continental | Black | $12995.00 | 23.1% | $4513.75 | $8500.00 | $1479.95 | $3646.09 | $408.15 | 42 | ○ |
| 9321 | 97 | 1996 | Continental | Beige | $11350.00 | 26.4% | $4567.76 | $7600.00 | $427.24 | $2414.01 | $348.26 | 42 | ○ |

Select By [All Vehicles ▽]   Sort By [Year/Model ▽]   Order [Descending ▽]   [Go]

[Enter Preferred Vehicle]

[Add a Vehicle to Inventory]

FIG. 6

SYSTEM AND METHOD FOR PROVIDING FINANCING

BACKGROUND OF THE INVENTION

The present invention relates to a method for facilitating the purchase of products on credit and a system for implementing such a method. An embodiment of the invention may be employed in the sale of automobiles and other vehicles. It should be noted, however, that the invention is not limited to vehicle sales only, and may also be applied to the sale of any products for which a customer desires to finance the transaction. Nonetheless, because vehicle sales represent a large segment of the consumer credit market and because vehicle sales represent an ideal setting for implementing the present invention, the invention will be described herein in the context of providing customer financing of automotive and other vehicle sales. In particular, the method and system of the present invention are especially well adapted for generating financing opportunities for customers having poor credit histories, providing relief from the arduous approval process currently in place for such customers.

Under present methods for selling cars and trucks, a customer typically enters onto a dealer's lot, identifies a particular make and model he or she is interested in, or identifies a specific vehicle on the lot which he or she desires to purchase. The customer will typically negotiates a price with one of the dealer's salespeople, and the salesperson attempts to arrange financing for the transaction. In some cases, especially those cases where the customer has a poor credit history, arranging financing may be the most difficult aspect of concluding a sale.

The financing process begins with the salesperson sitting down with the customer and completing a credit application. This involves receiving detailed financial information from the customer, including, among other information, the customer's Social Security number, annual income, current obligations, and so forth. The application typically also includes the price of the vehicle which the customer is attempting to purchase, the amount of the down payment the customer is able to pay toward the purchase, and in some cases the dealer's cost in obtaining the vehicle or some other indication of the market value of the vehicle. Once the application is completed, the salesperson sends the application to a lending institution for approval. In most cases the application is sent to the lender via facsimile.

Upon receiving the credit application, an agent of the lending institution evaluates the application and makes a decision as to whether the lender will extend credit to the customer for the purchase of the desired vehicle. In making this decision the agent typically pulls a credit report on the customer from one of the national credit bureaus and scores the customer based on his credit history. Because they represent a higher risk of non-payment, customers having poor credit histories typically will be charged a higher interest rate, or will be required to pay a larger down payment, or will be otherwise limited in the amount of financing for which they will be approved. In some cases, the customer may be rejected outright and the lending institution will refuse to finance a particular transaction. In either case, whether the financing institution agrees to finances the transaction or refuses to do so, the agent judging the application notifies the dealer's sales person of his or her decision, typically via return fax.

In the case that the financing institution agrees to extend financing, the transaction proceeds. The customer pays the dealer the down payment and signs a note promising the dealer to repay the balance with interest over time. Typically the dealer then assigns the note to the party extending the financing for an agreed upon amount. Normally the balance is to be paid in a series of monthly payments continuing until a total payment amount has been paid off. The dealer keeps the down payment and the lender pays the dealer the balance of the sale price. Thus, the dealer realizes an immediate profit equal to the sale price minus the dealer's cost for the vehicle. The financing institution, meanwhile holds the note and profits from the interest paid on the obligation extended to the customer. Alternatively, the financing institution may sell the note to another investor in order to receive a more immediate return. The customer gets the car.

If, however, the financing institution rejects the obligation application, the salesperson's work (and the customer's for that matter) begins in earnest. Obviously, the salesperson would like to complete the sales transaction despite the lender's initial rejection. At this point a number of options are available in order to rescue the deal. The salesperson can "shop the application around," sending the application to other lending institutions, some having less restrictive lending policies, or some who specialize in lending to sub-prime applicants, and the like. This option requires faxing the application to the additional lenders, waiting for the lenders to evaluate the application, and receiving the additional lenders' responses. This takes more time, preventing the salesperson from helping other customers and delaying the customer at the dealership. Furthermore, there is no guarantee that other lending institutions will agree to underwrite the transaction. Thus, after expending significant time and effort to apply to other lenders, the application may nonetheless end up being rejected.

Another option at this point is to alter the terms of the deal. The customer may agree to pay a higher down payment, thereby reducing the amount financed, the salesperson may agree to lower the price of the vehicle, again lowering the amount financed, or the customer and the salesperson may agree to work with a different less expensive vehicle. Pursuing any of these options requires changing the credit application to reflect the changes made in the sales deal, and requires resubmission of the application to one or more lending institutions for approval. Again, the modified credit application may be accepted or rejected. If rejected in this second round, further negotiations and changes may be necessary and the process may be repeated any number of times until finally a vehicle is found having a price at which the customer's down payment is sufficient and for which a financing company is willing to lend the balance. After much effort a sale may then be completed.

As the preceding discussion makes clear, the present way of negotiating financing, especially with high risk borrowers, is labor intensive, difficult, and inefficient. One of the reasons for this is that the dealer does not know up front how much money a lender will be willing to lend on a particular vehicle to a particular customer. Thus, the vehicles which a dealer presents to a customer, and the price at which the dealer offers the vehicle is completely unrelated to the decision as to whether financing will be made available to a particular customer on the desired vehicle. Only after several iterations of trial and error may a realistic transaction be arrived at, with each failed iteration wasting a significant amount of time for both the salesperson and the customer. Such inefficiency ultimately cuts into the dealer's profits. Therefore, it is highly desirable that a new method be developed for generating financing packages for financing the sale of vehicles and other products requiring a large up front investment from the consumer. A system for implementing such a method is also desired.

Ideally, a new method of generating financing packages would take into account a dealer's entire inventory, and generate financing options for each item of inventory. According to such a method, some such financing options may or may not be profitable for the dealer to enter into. The system for implementing the method may then identify which transactions are profitable and which are not, and a dealer's salesperson may choose to present transactions to a customer based on which transactions are the most profitable. In the event that no financing packages are generated which are acceptable to both the dealer and the customer, an improved system should allow for updated input data to be entered, and quickly recalculate financing packages based on the updated data. Furthermore, an improved method of generating financing packages would involve the dealer in the payment collection process, creating an additional profit source for the dealer. Such a method and a system must be flexible so that the impact of changes in the input data, such as changing the amount of the down payment, lowering the price of the product, and so forth, may be quickly and easily taken into account and reflected in the financing packages generated for the various items in the dealer's inventory.

SUMMARY OF THE INVENTION

The present invention provides a system and method for providing financing to the customers of a merchant to allow the customers to purchase products from the merchant's inventory. The system, implementing the inventive method, generates prospective financing packages for every item in the dealer's inventory. An advantage of the present invention is that may easily identify profitable financing packages so that the merchant may determine which inventory items he or she is willing to sell to the customer on credit. A feature of the present invention is that financing packages generated according to the invention involve the merchant dealer in the payment collection process, thereby creating an additional profit source for the merchant. Among the advantages of the present invention it that is that input data which determine the terms of the financing packages, such as a payment amount, may be altered, and new financing packages created based on the new data, so that many different financing options may be quickly and efficiently explored.

According to an embodiment of the invention, a method of providing financing for the purchase of products from a merchant or dealer is provided. Following the method, a database of the dealer's inventory is maintained. The inventory database includes records for a number of products in the dealer's inventory. Each product has a dealer cost associated the product, and a sale price at which the dealer desires to sell the product. The method further includes the steps of gathering information from the customer, including a down payment amount which the customer has available to pay towards the purchase of a product, and calculating a credit score for the customer based at least in part on the information gathered from the customer. Additional steps include determining an advance amount to be paid to the dealer for each individual product in the dealer inventory in the event that that particular product is sold to the customer and calculating a front-end profit to be realized by the dealer for the sale each individual product in the event the particular product is sold. The front-end profits based on the dealer costs associated with the individual products, the advance amount determined for each individual product, and the down payment amount. Finally, the method includes the step of presenting a financing package to the dealer for each individual product in the dealer's inventory, allowing the dealer to selectively present financing and purchase options to the customer.

An additional feature of the inventive method is that monthly payments collected from the customer is satisfaction of the amount financed are shared with the dealer. Initially the dealer's share of the collected payments is applied to pay off the amount advanced to the dealer. Thereafter, the dealer's share of collected payments provide an additional profit source to the dealer. The method further includes provisions for accelerating the payment of such back-end profits to the dealer.

The present invention further encompasses a system for providing guaranteed financing for the customers of a merchant or dealer allowing the customer to purchase a product from an inventory of a dealer. The system includes a network, a database configured to store the inventory of a dealer; a server configured to access the database and a user terminal adapted to accept credit information from a customer. The user terminal is adapted to transmit and receive credit information and processing commands to and from the server over the network. The server and database are further adapted to calculate a credit score for customers based on a customer's the credit report and other credit information. The system calculates a front-end profit for each of the items in the database based on the customer's credit score and the dealer costs associated with each item. The server is also configured to transmit financing options to the user terminal be displayed for the dealer. The dealer may then present financing options to the customer for the purchase of at least one item from the dealer's inventory. The financing options transmitted to the dealer include the dealer's front-end profit, based on the down payment an advance paid to the dealer, and the dealer's costs associated with each item. The financing options also include the dealer's estimated back-end profits based on the dealer's share of collected payments received from the customer in satisfaction for the amount financed.

By employing the present invention, a merchant or dealer is presented with financing packages for every product in his or her inventory. The financing packages are presented in a manner in which the dealer may quickly determine which financing packages are the most advantageous, and may direct the customer toward the purchase of the products associated with the most desirable financing packages. Furthermore, input data may be easily changed to rapidly generate new prospective financing packages in order to generate packages that may be more appealing to the customer. The ability to recalculate financing packages based on altered input data greatly reduces the time required to arrive at acceptable financing terms.

Additional features and advantages of the present invention are described in, and will be apparent from, the following Detailed Description of the Invention and the figures.

BRIEF DESCRIPTION OF THE FIGURES

FIG. 2 is a diagram illustrating a screen for entering vehicle information into an inventory data base;

FIG. 3 is a diagram illustrating a screen for updating vehicle information previously entered into a database;

FIG. 4 is a diagram illustrating a screen for displaying vehicle data records stored in a database;

FIG. 5 is a diagram illustrating a credit application page;

FIG. 6 is a diagram illustrating a screen for displaying financing packages;

DETAILED DESCRIPTION OF THE INVENTION

The present invention relates to a system and method for providing financing toward the purchase of a product by a customer from a merchant. In an embodiment, the system and method for providing financing are configured to ensure that at least one financing package is made available to every customer who desires to finance the purchase of an item from the merchant. It is possible that the financing packages generated according to the present system and method will include provisions that are not acceptable to the merchant, and the merchant may decide not to extend financing to a particular customer. However, this decision rests with the merchant. The present system and method guarantee that financing packages, attractive or otherwise, will be made available for all of the merchant's customers.

An embodiment of the system and method of the present invention is directed toward providing financing for the purchase vehicles from a dealer. This particular embodiment will be described in detail below, however, it should be noted that the system and method of the present invention may also be applied toward the financing of other products which are commonly purchased on credit.

Figure 1:
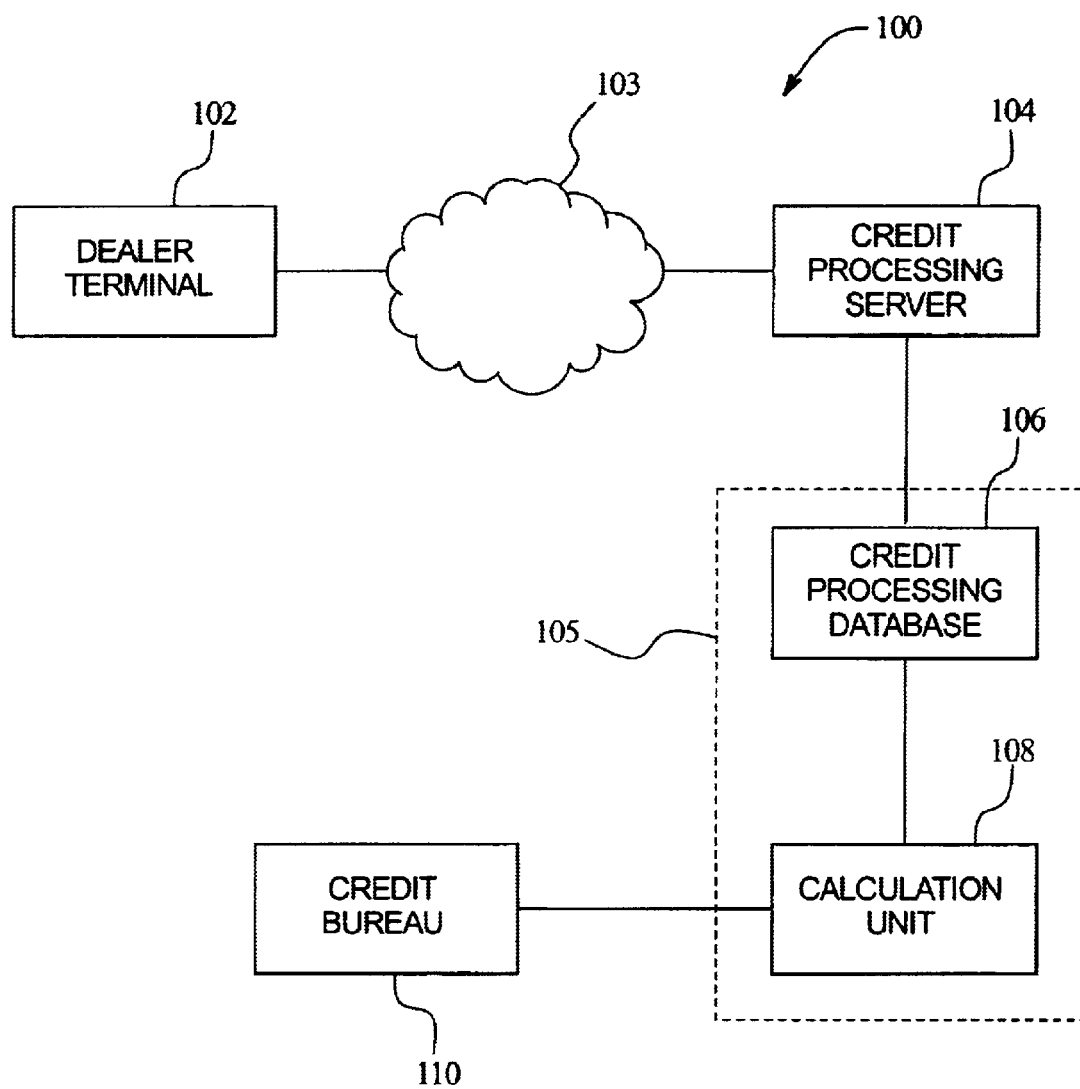
FIG. 1 is a block diagram showing a system for providing financing toward the purchase of a product by a customer from a merchant.

FIG. 1 shows a block diagram of a system 100 according to an embodiment of the invention, wherein financing is to be provided towards the purchase of a vehicle by a customer from an automobile dealer. The system 100 includes a dealer terminal 102, a credit processing server 104, and a financing package generation unit 105 which includes a credit processing database 106, and a calculation unit 108. A credit bureau 110 is also shown. The credit bureau 110 is operated by a third party and is not, strictly speaking, part of the system 100. However, as will be described below, the interaction between the calculation unit 108 and the credit bureau 110 is integral to the operation of the system 100. Therefore the credit bureau has been included with the system 100 shown in FIG. 1.

In the embodiment shown, the dealer terminal 102 is connected to the credit processing server 104 via a network 103, such as for example, the Internet. Thus, the dealer, or a sales agent associated with the dealer, may communicate with the credit processing server 104 using a common Internet web browser running on the dealer terminal 102. The dealer communicates with the credit processing server 104 via the dealer terminal 102 to perform a variety of tasks related to procuring financing for potential customers. For example, the dealer may use the dealer terminal to maintain a database of all vehicles available for sale in the dealer's inventory. The dealer may also use the dealer terminal 102 to submit customer credit applications to the credit processing server 104 for processing.

The credit processing server 104 is also connected to the financing package generation unit 105. The credit processing database and the calculation unit 108 interact with one another and exchange data to generate financing packages on request from the dealer, based on data supplied by the dealer through the credit processing server 104, and inventory data stored in the credit processing database 106 itself. The connection between the credit processing server 104 and the financing package generation unit 105 may also be provided by a public network such as the Internet, or by a private network.

The credit processing server 104 provides an interface between the user and the financing package generating unit 105. Various web pages are transmitted from the credit processing 104 to the dealer terminal 102 over the network 103 to be displayed by the dealer's web browser. In most cases the web pages will include data fields in which the dealer may enter data to be sent to the credit processing server 104. The web pages may also include command options which allow the dealer to instruct the credit processing unit 104 to perform various functions. The credit processing server 104 in turn communicates data received from the user terminal 102 to the financing package generating unit 105 with instructions for processing the data. When appropriate, the financing package generating unit 105 returns processing results to the credit processing server 104 and the results are transmitted as web pages to the dealer terminal 102 for display by the dealer's web browser.

The credit processing database 106 is configured to store the dealer's entire inventory of vehicles. Individual records for each vehicle in the dealer's inventory are stored in the database. The records include information such as the vehicle identification number, the make and model of the vehicle, the color of the vehicle, the dealer's cost in obtaining and preparing the vehicle, the condition of the vehicle, the desired selling price, the length of time the vehicle has been in inventory, and other useful information.

The records stored in the database 106 may be entered and edited by the dealer from the dealer terminal 102. By selecting the appropriate options available on a credit processing home web page which has been transmitted from the credit processing server 104 to the dealer terminal 102 and which displayed by the dealer's web browser, the dealer may access and display a vehicle entry page for entering new vehicles into the database 106.

In order to access the vehicle entry page the dealer may be required to enter unique identifying information such as a user name and password. Based on the user name and password, credit processing server will access the appropriate database associated with the particular dealer in question. A sample of a vehicle entry page 120 is shown in FIG. 2. The vehicle entry page 120 includes fields for entering a stock number 122; a vehicle identification number (VIN) 124; the date on which the dealer purchased the vehicle 126; the vehicle color 128; and the mileage on the vehicle 130. By selecting the continue to add option 132, the dealer may access further pages for entering additional data related to the vehicle. In addition to adding new vehicles to the inventory database, the dealer may also access a vehicle update page 140 as shown in FIG. 3 in order to change or correct data corresponding to vehicles already entered into the database 106. Data fields that may be altered in the sample vehicle update page 140 include the stock number 142; the purchase date 144; the vehicle status 146; color 148; and mileage 150.

An example of a dealer's inventory stored in database 106 is shown at 160 in FIG. 4. As can be seen, the inventory includes a number of separate vehicle records 162. Each record includes specific information regarding each vehicle. Thus, the data fields displayed on the inventory page 160 include the stock number 164; the number of days the vehicle has been in inventory 166; the model year of the vehicle 168; the vehicle make 170; and model 172; the color of the vehicle 174, the number of miles on the vehicle 176; the typical retail price of a vehicle of the same make and model when clean 180; the retail average of such vehicles 182; the wholesale average of such a vehicle when clean 184; the wholesale average when the vehicle is in average condition 186; the wholesale average when in rough condition 188; the dealer cost for the vehicle 190; and the dealer's selling price 192.

In addition to maintaining the inventory database, the dealer may also use the dealer terminal 102 to enter a customer's financial data in order to generate financing packages for allowing the customer to purchase one of the dealer's vehicles on credit. Again, by selecting the appropriate options on a credit processing web page transmitted from the credit processing server 104 to the dealer terminal 102, a credit application page 200 such as that shown in FIG. 5 is sent from the credit processing server 104 to the dealer terminal 102. The application page includes a number of blank data fields for entering financial data about the customer. The data to be collected include personal information such as the customers social security number 202; date of birth 204; last name 206; first name 208; and middle initial 210. Address information to be gathered includes street number 212; street name 214; street type 216 (i.e. avenue, lane, etc.); apartment number 218; post office box 220; city 222; state 224; zip code 226 and e-mail address 230. A field 232 is also provided for identifying the dealer's sales person who is responsible for the transaction. Additional financial data to be collected from the customer include the number of years 236 and months 238 the customer has lived at his or her current address; whether the customer rents or owns his or her residence 240; the customer's current rent or mortgage payment; a cash down payment amount the customer can put down toward the purchase 244; a gross trade-in value 246 if the customer is trading-in another vehicle; a pay-off for the trade-in 248; a net trade-in 250; and a total down payment 252.

When all of the data have been entered into the application page, the application data are transmitted to the credit processing server 104 for processing. The credit processing server 104 accesses the credit processing database 106, and the database 106 shares information with the calculation unit in order to generate financing packages for every vehicle in the dealer's inventory.

The calculation unit 108 receives the customer's financial data and pulls a credit report on the customer from the credit bureau 110. The credit report is received from the credit bureau electronically, and the calculation unit 108 parses the received data into a format that can be used for calculating a credit score for the customer. The credit score is based on a number of factors including the customer's credit history, income, current obligations, and the like. The financing package generating unit 105 uses the customer's credit score, the inventory data stored in the credit processing database 106, and financial data from the credit application 200 to generate financing packages for each vehicle in the dealer's inventory. These financing packages are then transmitted to the dealer terminal 102 for display by the dealer's web browser. Sample financing packages 300 for a small number of vehicles are shown in FIG. 6. The financing packages presented to the merchant are customized for the individual customer for each individual product in the merchant's inventory. As will be described in more detail below, the financing packages are displayed in a manner such that the dealer is able to quickly surmise which financing packages are financially attractive the dealer may then steer the customer toward purchasing a vehicle which may be financed on terms that will be most profitable to the dealer. Conveniently, the financing package display screen is provided with sorting options 334, 336 and 338 which allow the dealer to customize the manner in which the financing packages are displayed. Another important feature of the system is that financing packages that may violate certain lending criteria of the lender. It identifies for example, the down payment amount may not meet the minimum percentage of the total sale price required by the lender, or the monthly payments may exceed a predefined maximum payment threshold. Thus, green 332 and yellow 334 indicators are provided to indicate which packages are valid and which are not, respectively.

The financing packages 300 generated by the system of the present invention and displayed in FIG. 6 differ from prior art financing packages. According to prior art financing transactions, the dealer's involvement in the financing transaction ends nearly immediately upon completing the sale of the vehicle. The dealer keeps the customer's down payment and the customer signs a note promising to repay the balance. The dealer immediately assigns the note to the party providing financing, and the party providing the financing agrees to pay the dealer an agreed upon amount in exchange for the customer's obligation. The dealer has no further interest in prior art financing transactions. It is then up to the party who extended the financing to collect monthly payments from the customer in satisfaction of the obligation amount covering the balance of the sale price and any interest that accrues on the balance. According to the present invention, on the other hand, the dealer remains a party to the financing transaction even after the sale of the vehicle is complete. This is accomplished by granting the dealer a stake in the payments collected from the customer in payment of the outstanding obligation.

According to the financing packages 300 of the present invention, the customer agrees to purchase a vehicle at a set price. The customer pays the agreed upon down payment and agrees to pay the balance of the sale price with interest in a series of monthly payments over an extended period of time. The party extending the financing meanwhile agrees to pay the dealer an advance amount when the sale is complete. The party extending financing to the customer further agrees to pay the dealer a share of the monthly payments collected from the customer. Thus, the financing package of the present invention include a dealer front-end profit at the time of sale and a back-end profit based on future collected payments.

The front-end profit is the actual profit that the dealer realizes immediately upon closing a sale with the customer. The front-end profit is based on the amount of the down payment paid by the customer, the advance amount that the party providing the financing agrees to pay to the dealer in the event of a sale, and the dealer's costs associated with obtaining and preparing the vehicle being sold, taxes, service fees and the like. Put simply, the front-end profit, is equal to the down payment amount plus the advance amount minus the dealer's costs.

The back-end profits are generated by the monthly payments received from the customer in satisfaction for the outstanding obligation. According to the present invention the dealer receives a share of all customer payments received. In an embodiment of the invention the dealer receives 80% of collected payments and the party providing the financing retains 20%. Initially, the dealer's share of the received payments is credited against the amount advanced by the party financing the transaction at the time of the sale. Therefore, the dealer's back-end profits are reduced by the amount of the advance, the part servicing fee, as well as any out of pocket costs incurred by the party providing financing in collecting the fee. A total payment amount can be calculated by multiplying the customer's monthly payment amount by the total number of payments to be received. Thus, the dealer's back-end profits may be estimated by multiplying the total payment amount by the dealer's percentage share of collections and subtracting the advance amount. This amount assumes that all payments will be received. A more realistic estimate of the dealer's back-end profit may be arrived at by further multiplying the total payment amount by an expected payment collection rate.

The amount of money the customer has available for a down payment is determined by the customer. The vehicle costs and the sale price are determined by the dealer. Finally, the advance amount is determined by the party extending financing based on the customer's credit score, the dealership's past collection history, the particular vehicle being considered and other factors. All of these factors are known or may be calculated at the time the financing packages are generated. Thus, each financing package 300 displayed in FIG. 6 includes the selling price 312; the down payment percentage 314, the advance amount 316; the dealer's cost 318; the dealer's front-end profit 320; the dealer's estimated back-end profit 322; the customer's monthly payment amount 324; and the total number of monthly payments 326. Additional information displayed includes the dealer's stock number 302; the number of days in inventory 304; model year 306; the model name 308; and the color 310. Therefore, all aspects of the financing packages, including the dealer's front-end profits and estimated back-end profits can be determined up-front.

Figure 8:
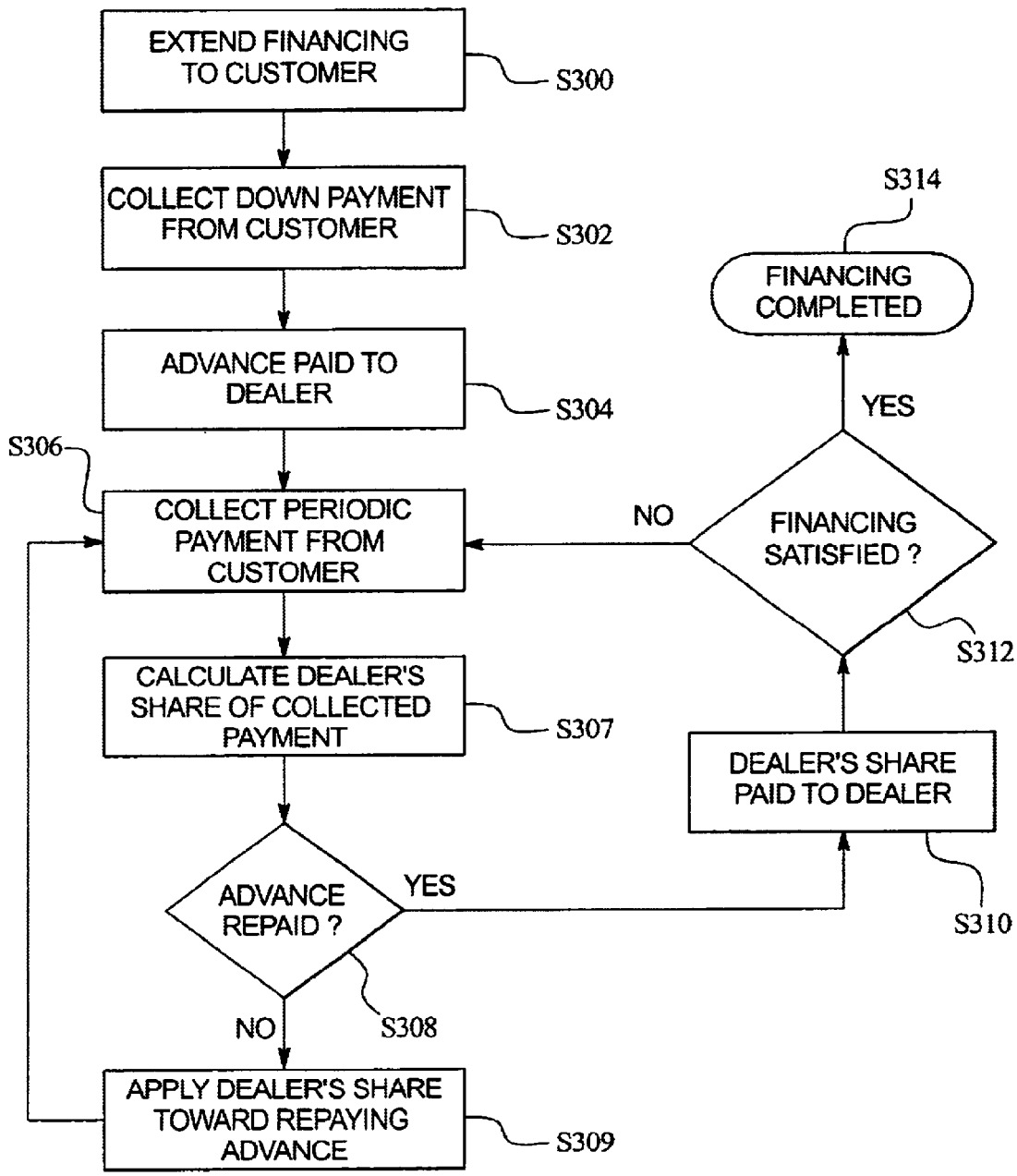
FIG. 8 is a flowchart illustrating a method for extending financing and collecting and dispersing received payments according to the present invention; an embodiment of a basic financing stage of a completed transaction for the purchase of a vehicle by a customer.

In an embodiment of the system 100, the financing packages 300 displayed in FIG. 8 are transmitted from the credit processing server 104 to the dealer terminal 102 as a web page to be displayed by the dealer's web browser. The web page includes sorting commands 336, 338 and 340 which allow the dealer to control the order in which the financing packages 300 are displayed. For example, the dealer can choose to view financing packages for all vehicles, only those financing packages having a green indicator, or only financing packages with a yellow guarantee indicator. Financing packages can also be sorted by, for example, the year/model of the vehicle, the number of days the vehicle has been in stock, the up-front profit, and periodic payment. Further, the displayed information can be sorted in ascending or descending order. Thus, the dealer can quickly identify financing packages that are financially favorable to the dealer. Such information will help determine which financing packages the dealer decides to present to the customer. For example, the dealer may wish to present vehicles and their corresponding financing packages having the highest up front profits, or the dealer may attempt to move vehicles that have been in inventory for an extended period of time. Furthermore, if none of the financing packages are acceptable to the customer, new financing packages can be generated by altering the input data, such as by increasing the down payment amount or lowering the sale price.

In addition to the system 100 the present invention further encompasses a method of providing guaranteed financing for all of a dealer's potential customers. The inventive method is best understood with reference to the flowcharts shown in FIGS. 7, 8 and 9.

Figure 7:
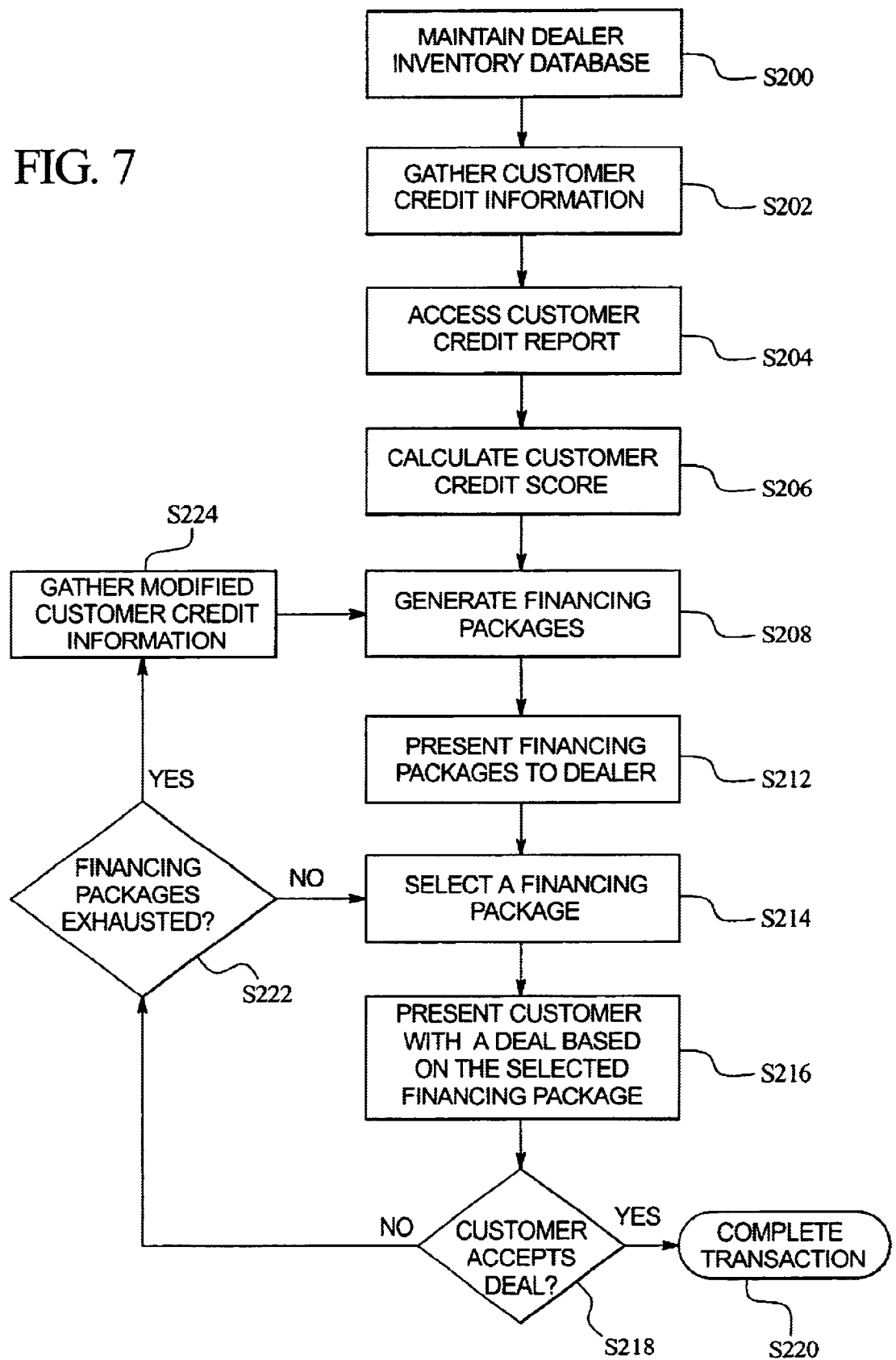
FIG. 7 is a flowchart illustrating a method for providing guaranteed financing towards the purchase of a vehicle by a customer from a dealer.

FIG. 7 shows a method of generating financing packages to be presented to a customer and entering into a financing agreement with the customer according to one of the financing packages presented. As shown in FIG. 7, the process begins at step S200 where the dealer creates and maintains a dealer inventory database (i.e., a database of each individual vehicle in the dealer's inventory). At step S202, the dealer gathers financial data from the customer. The data collected from the customer are entered into a credit application and the dealer submits the application. The credit information collected may include, for example, the customer's Social Security number and a down payment amount to be provided by the customer.

Next, a credit report for the customer is accessed at step S204, and a credit score is calculated at step S206. The credit score is based on the credit report and other data collected in step S202. At step S208 separate financing packages are generated for each vehicle in the dealer's inventory. The numerous financing packages are presented to the dealer at step S212 in a manner which allows the dealer to quickly ascertain which packages are most financially advantageous, thereby facilitating selection of a desirable financing package in step S214. The selected package is then presented to the customer in step S216.

At step S218, the customer decides whether or not to accept the financing package presented by the dealer. If the customer accepts the deal, the method proceeds to step S220 where the transaction is completed. If, on the other hand, the customer does not accept the deal but is interested in exploring other options, a determination is made at step S222 whether all of the financing packages which the dealer is willing to extend to the customer have been exhausted. If they have not been, process flow returns to step S214 where the dealer may select a different financing package on another vehicle to present to the customer in step S214. In this manner all financing options on all vehicles may be explored. If it is determined at step S222 that the dealer has presented all of the financing packages he or she is willing to present, the process flow proceeds to step S224. In this step the dealer may modify portions the customer's credit information on which the original financing packages were based. Typically this step will amount to increasing the down payment amount the customer is willing to put down toward the vehicle. The modified credit information is submitted and the method returns to step S208 where new financing packages reflecting the altered input data are generated for each vehicle. Steps S212, 214, 216 and 218 are then repeated until a financing deal is reached, or until all other options have been exhausted.

FIG. 8 is a flowchart depicting the process for extending financing according to the present invention once financing package and vehicle have been agreed upon. Financing is extended to the customer in step S300. Thus, the customer takes possession of the vehicle without paying the full purchase price to the dealer, but only the down payment amount. The dealer collects and keeps the agreed upon down payment for himself or herself. At step S304, the advance amount is paid by the party providing the financing to the dealer as agreed upon under the terms of the financing package. Thereafter the customer makes periodic payments in satisfaction of the obligation owed. Preferably payments from all of the dealer's customers on outstanding obligations are made on a monthly basis. Such payments are collected from the customers at step S306. At step S307, the dealer's share of the periodic payments collected at step S306 is calculated. In an embodiment of the invention, the dealer's share of the collected payments is 80%. Next, a determination is made at step S308 as to whether or not the advances paid to the dealer at step S304 for each transaction have been fully offset by the dealer's share of the customer's monthly payments that have been received to date on all transactions entered by the dealer. If the advances have not been fully repaid, the dealer's share of the received payments as calculated in step S307 are applied toward the balance of the advances at step S309. In other words, the balance of the amount advanced is reduced by an amount equal to the dealer's share of the received payments. After applying the dealer's share toward repaying the advances at step S309, the process flow proceeds back to step S306 where the next periodic payment is collected from the customer.

On the other hand, if it is determined at step S308 that the advances have been fully offset by the dealer's share of collected payments, then the entire dealer's share of the monthly payments collected in step S306 is paid to the dealer at step S310. Thus, after the advance amount has been offset, the dealer's share of the monthly payments represents additional back-end profit realized by the dealer. After the dealer's share has been paid to the dealer at step S310, a determination is made at step S312 as the whether or not the total payment amount has been received and the obligation has been satisfied. If future periodic payments remain uncollected under the terms of the transaction, the process flow proceeds back to step S306 where the next periodic payment is collected from the customer. If it is determined at step S312 that the terms of the transaction have in fact been satisfied, the process flow proceeds to step S314 and the financing transaction is completed.

Figure 9:
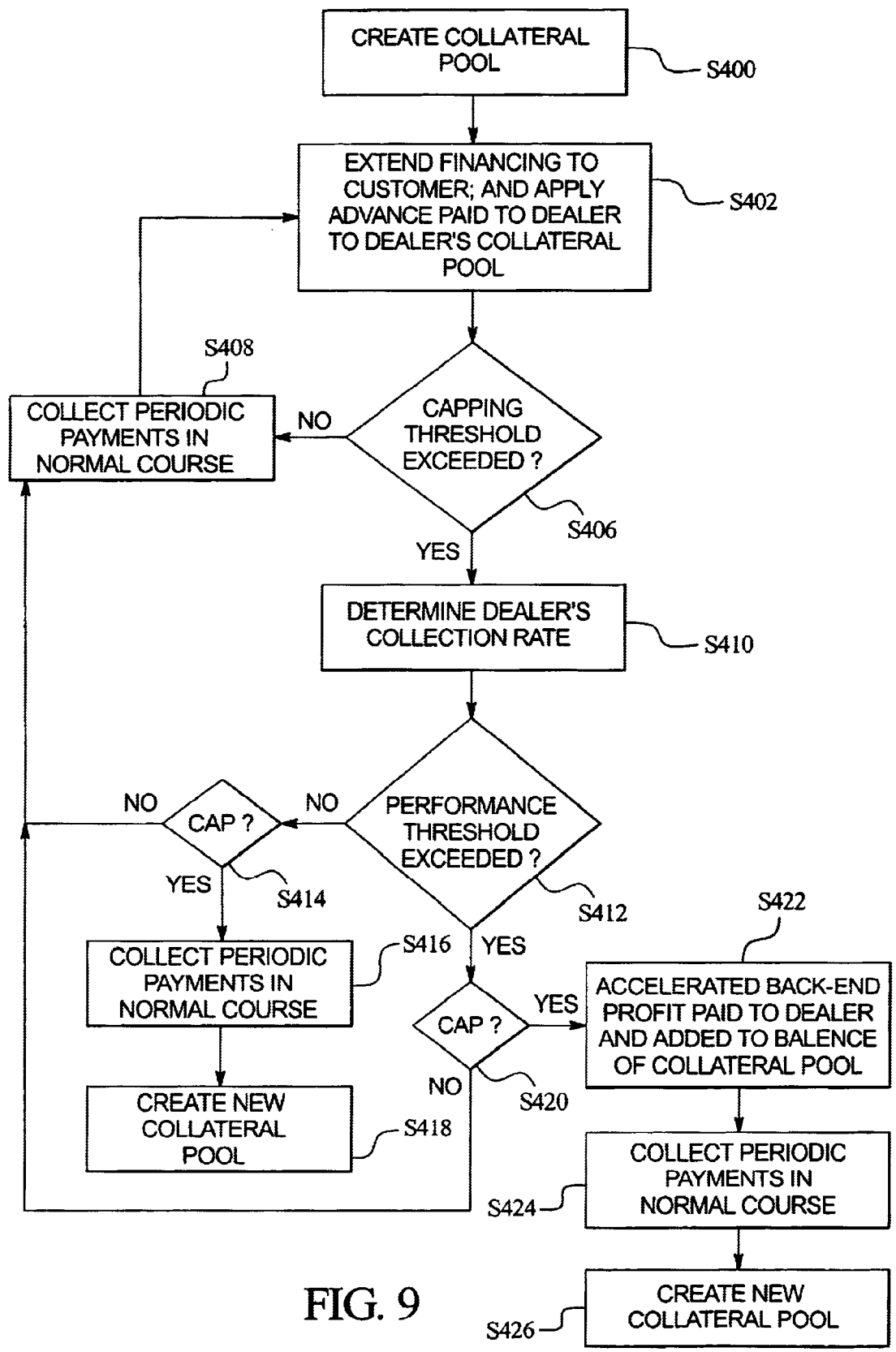
FIG. 9 is a flowchart illustrating a method of accelerating the payment of back-end profits to the dealer.

FIG. 9 is a flowchart illustrating an embodiment of the method of the present invention wherein payment of a portion of the dealer's estimated back-end profits is accelerated based on a satisfactory dealer collection rate. The process begins at step S400, where a collateral pool is created. The collateral pool is an accounting construction in which the advances paid to a dealer for a number of financing transactions are grouped together in a single account, or "pool", as will be described below, a single dealer may have a number of active collateral pools.

At step S402, financing is extended to a customer of the dealer in furtherance of the sale of a vehicle. The advance amount is paid to the dealer and added to the balance of the collateral pool. Thereafter, periodic payments are collected from the customer in the normal course, in satisfaction of the obligation granted to the customer (see steps S306–S314 in FIG. 8). At step S406, a determination is made as to whether or not the number of transactions in the collateral pool exceeds a capping threshold. The capping threshold is a predefined number of financing transactions that the dealer must have closed in which the advance amount has been applied to the collateral pool in order for the dealer to be eligible for capping the pool and receiving accelerated back-end payments. In an embodiment of the invention, the capping threshold is set at 100 financing transactions. If at step 406 it is determined that the number of transactions does not exceed the capping threshold, the process flow proceeds to step S408 where periodic payments for all of the transactions in the collateral pool continue to be collected in the normal course.

If it is determined at step S406 that the number of transactions does in fact exceed the capping threshold, the dealer's collection rate is determined at step S410. According to an embodiment of the invention, the collection rate is determined by calculating the percentage of the total amount of periodic payments collected for all of the dealer's transaction across all of the dealer's collateral pools for the previous nine months versus the total amount of periodic payments due for the same period. Once the calculation rate has been calculated, a determination is made at step S412 as to whether or not the collection rate exceeds a predefined performance threshold. Again, in an embodiment of the invention, the preferred performance threshold is a collection rate of 80% or higher. If the collection rate does not exceed the performance threshold, the dealer must choose whether or not to cap the collateral pool at step S414. If, at step S414, the dealer chooses not to cap the collateral pool, the process flow proceeds back to step S408 where periodic payments for all of the transactions in the collateral pool continue to be collected in the normal course, and additional financing transactions may be added to the pool as step S402 may be repeated. The dealer may choose not to cap the collateral pool, for example, in an attempt to raise the collection rate above the performance threshold. In order to qualify for accelerated back-end payments at a later date. Alternately, even if the dealer's collection rate does not meet the desired collection rate performance threshold, the dealer may nonetheless choose to cap the collateral pool at step S414. In this case, the process flow proceeds onto step S416 where periodic payments for the transactions in the collateral pool are again collected in the normal course. However, the advances from future financing transactions will be applied to a new collateral pool as indicated in step S418.

Returning to step S412, if the number of transactions applied to the collateral pool exceeds the capping threshold, and if the dealer's collection rate exceed the desired performance threshold, the dealer may choose to cap the pool at step S420 in order to receive accelerated back-end payments. If the dealer chooses not to cap the collateral pool at step S420, the process flow proceeds back to step S408 where periodic payments for the transactions in the collateral pool are collected in the normal course. However, if the dealer does choose to cap the collateral pool at step S420 the dealer is eligible to receive an accelerated back-end payment at step S422. In an embodiment of the invention, the amount of the accelerated back-end profit is equal to 15% of the expected back-end profit. This amount is advanced directly to the dealer, and is added to the outstanding balance of the collateral pool. At step S424, periodic payments continue to be collected for all transactions in the collateral pool, in the normal course until the total payments for all of the transactions have been received. At step, S426, the dealer may create a new collateral pool for future transactions.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for providing a financing source to a customer to purchase a product selected from an inventory of products, the method comprising the steps of:

receiving information related to a database of a dealer's inventory, wherein the dealer's inventory includes a plurality of products, each product having a dealer cost associated therewith and a sale price at which the dealer desires to sell the product;

receiving information from the customer including a down payment amount which the customer has available for a down payment towards the purchase of a product;

calculating a credit score for the customer based at least in part on the information gathered from the customer;

determining an advance amount to be paid to the dealer from the financing source for each individual product in the dealer inventory in the event that that particular product is sold to the customer;

calculating a front-end profit to be realized by the dealer for each individual product in the dealer inventory based on the dealer cost associated with each individual product, the advance amount determined for each individual product, and the down payment amount; and presenting a financing package to the dealer for each individual product in the dealer's inventory for immediate offer for sale to the customer.

2. The method of providing financing of claim 1 wherein the financing package is automatically recalculated to produce a new financing package for an item and transmitted to the user terminal for immediate offer for sale to the customer.

3. The method of claim 2, wherein the financing package includes the sale price, the down payment amount, an amount financed, an interest rate, a total payment amount, and a monthly payment amount to be paid by the customer until the total payment amount has been paid.

4. The method of claim 3 further comprising the step of collecting monthly payments from the customer in the monthly payment amount and paying a fraction of the collected monthly payments to the dealer.

5. The method of claim 4 wherein the fraction of received payments paid to the dealer is 80%.

6. The method of claim 4 further comprising the step of applying the fraction of the collected monthly payments paid to the dealer to offset the advance amount paid to the dealer at the time the product was sold.

7. The method of claim 4 further comprising the steps of providing financing to a plurality of customers for the purchase of a plurality of products from the dealer, and applying the advance amount from each transaction to a collateral pool, whereby the fraction of the collected payments from each customer is applied to offset a total amount advanced for all transactions.

8. The method of claim 7 further comprising the step of capping the collateral pool after a fixed number of financing transactions have been entered such that advances paid to the dealer for financing transactions entered after the collateral pool has been capped are applied to a second collateral pool.

9. The method of claim 8 further comprising the steps of:

at a predefined time after the first collateral pool has been capped determining a collection rate of monthly payments received for all financing transactions entered by the dealer; and issuing a payment to the dealer in an amount equal to a percentage of the fraction of the collected monthly payments to be paid to the dealer multiplied by an amount expected to be collected from all of the transactions, when the collection rate exceeds a predefined threshold.

10. The method of claim 1 further comprising the steps of:

providing a user terminal for entering the customer information;

providing a server connected to the user terminal via a network, and having access to the dealer inventory database; and configuring the server to receive the customer information from the user terminal, to access the dealer inventory database, to generate the financing packages for each individual product in the dealer's inventory based on the customer information and the inventory data stored in the database, and to transmit the financial packages to the user terminal over the network for display on the user terminal.

11. The method of claim 10 further comprising the steps of sorting the financing packages displayed on the user terminal according to a selectable criteria.

12. The method of claim 11, wherein the selectable criteria is selected from the group consisting of: cost; time in inventory; selling price; front-end profit; and back-end profit.

13. The method of claim 1 wherein the dealer's inventory comprises a plurality of vehicles.

14. A system for providing guaranteed financing to a customer for allowing the customer to purchase a product from an inventory of a dealer, the system comprising:

a financing package generating unit including a database configured to store the inventory of the dealer including a plurality of individually priced items, and a calculation unit;

a user terminal adapted to accept credit information from the customer and further adapted to transmit the credit information over a network; and a server configured to receive credit information through the network, and to access the financing package generating unit, which retrieves a credit report related to the customer, and calculates a credit score for the customer based on the credit report and the credit information, the financing package generating unit further generating financing packages for each of the individually priced items in the database, the financing packages including a front-end profit calculated based on the credit score, payment of an advance amount to the dealer in furtherance of the sale, and dealer costs, the server beings further configured to transmit the financing packages to the user terminal for presentation to the dealer for immediate offer for sale to the customer.

15. The system for providing guaranteed financing as claimed in claim 14, wherein the user terminal is further adapted to process a sale of an approved product to the customer, wherein the approved product is selected from the individually priced items in the inventory for which financing options are displayed on the user terminal, and wherein processing the sale includes accepting a down payment amount from the customer and extending financing to the customer.

16. The system for providing guaranteed financing as in claim 14, wherein the financing packages are automatically recalculated to produce a new financing package for an item and transmitted to the user terminal for immediate offer for sale to the customer.

17. The system for providing guaranteed financing as claimed in claim 14, wherein the server is further configured to collect periodic payments from the customer in satisfaction of the financing extended to the customer.

18. The system for providing guaranteed financing as claimed in claim 17, wherein the dealer receives a share of the payments collected from the customer.

19. The system for providing guaranteed financing as claimed in claim 18, wherein the share received by the dealer is 80%.

20. The system for providing guaranteed financing as claimed in claim 19, wherein the share received by the dealer is applied to offset the amount of the advance paid to the dealer.

21. The system for providing guaranteed financing as claimed in claim 18, wherein the server is further adapted to calculate the dealer's back-end profits based on estimated collection rates of the periodic payments and to process a payment of the back-end profits to the dealer, wherein the back-end profits are the dealer's share of collected payments received after the advance has been fully offset.

22. The system of claim 14, wherein the user terminal is capable of sorting the financing packages according to a selectable criteria.

23. The system of claim 22, wherein the selectable criteria is selected from the group consisting of: cost; time in inventory; selling price; front-end profit; and back-end profit.

24. The system for providing guaranteed financing as claimed in claim 14, wherein the inventory of the dealer comprises a plurality of vehicles.

25. A system for generating financing packages provided by a financing party, for a customer purchase of a product from a dealer's inventory of a plurality of products, the system comprising:
   a database for storing information related to products in the dealer's inventory including a dealer cost associated with each product;
   a user terminal, communicatively coupled to said database, for receiving financial information about the customer in relation to said products; and
   a server having access to the data in the database adapted to communicate with the user terminal over a network, whereby the financial information about the customer may be transmitted to the server,
   the server generating a financing package for each product in the dealer's inventory and transmit financing terms for each financing package to the user terminal via the network for presentation to the user for immediate purchase, wherein the server is further configured such that the financing terms of each financing package include an advance amount to be paid to the dealer by said financing party if the customer purchases the product associated with the financing package.

26. The system of claim 25 wherein the server is configured such that the financing terms transmitted to the dealer include the dealer's costs associated with the product, a final sale price, an advance amount to be paid to the dealer by a party providing the financing, a down payment amount to be paid by the customer, a front end profit to be realized by the dealer at the time of sale of the product, a total amount financed, an interest rate, a total payment amount, and a back-end profit to be realized by the dealer if the customer repays the total payment amount.

27. The system of claim 25 wherein the server is configured to pull a credit report on the customer, and calculate a credit score based on data contained in the credit report and the financial information provided by the customer.

28. The system of claim 25 wherein the server is configured to automatically recalculate the financing package to produce a new financing package for an item and transmitted to the user terminal for immediate offer for sale to the customer.

29. The system of claim 25 wherein the advance amount is calculated on credit risk factors associated with the customer, contract variables related to the product, and historical collection data for past financing transactions entered into by the dealer.

30. The system of claim 25 wherein the dealer's inventory comprises a plurality of vehicles.

31. The system of claim 25, further adapted to recalculate financing packages for each item in the dealer inventory based on updated customer data entered in the user terminal.

32. The system of claim 25, wherein the user terminal is capable of sorting the financing packages according to a selectable criteria.

33. The system of claim 32, wherein the selectable criteria is selected from the group consisting of: cost; time in inventory; selling price; front-end profit; and back-end profit.

34. A method for a financing party to provide financing toward the purchase of a product by a customer from a merchant, the method comprising the steps of:
   determining a down payment amount that the customer has available to pay toward the purchase of one or more of a merchant's products from an inventory database;
   determining a credit risk associated with the customer;
   determining an advance amount to be paid to the merchant by the financing party;
   generating a financing package for each product in the merchant's inventory of products, the financing packages being based on each individual product, the down payment amount, the advance amount, and the credit risk associated with the customer; and
   presenting the financing packages for each individual product to the merchant,
   whereby the merchant may select one or more of the financing packages to present to the customer for immediate purchase.

35. The method of claim 34 wherein the merchant's inventory comprises a plurality of vehicles.

36. The method of claim 34 wherein the step of generating a financing package for each product in the merchant's inventory of products further comprises:
   determining the merchant's costs associated with the product; and
   determining a front-end profit that will be realized by the merchant if the product is sold and the sale is financed according to the financing package.

37. The method of claim 36 wherein the step of generating a financing package for each product in the merchant's inventory of products further comprises:
   determining an interest rate based on the customer's credit risk;
   calculating an amount financed from a sale price and the down payment amount;
   calculating a total payment amount based on the amount financed, the interest rate, and a length of time over which the amount financed is to be repaid by the customer; and
   estimating a back-end profit for the merchant based on the merchant receiving a percentage of the total payment amount to be paid by the customer.

38. The method of claim 37 wherein the step of estimating the back-end profit further comprises the step of estimating a percentage of the total payment amount the customer is likely to repay.

39. The system of claim 34 further comprising the step of enabling the merchant to sort the financing packages according to a selectable criteria.

40. The system of claim 39, wherein the selectable criteria is selected from the group consisting of: cost; time in inventory; selling price; front-end profit; and back-end profit.

41. A method that allows a dealer to offer a financing source to a customer to purchase a product selected from an inventory of products maintained by a dealer, the method comprising the steps of:

accessing a database of the dealer's inventory, the dealer's inventory including a plurality of products, each product having a dealer cost associated therewith and a sale price at which the dealer desires to sell the product;

calculating a credit score for the customer based at least in part on the information gathered from the customer;

determining an advance amount to be paid to the dealer from the financing source for each individual product in the dealer inventory in the event that that particular product is sold to the customer;

calculating a front-end profit to be realized by the dealer for each individual product in the dealer inventory based on the dealer cost associated with each individual product, the advance amount determined for each individual product, and the down payment amount; and generating a financing package to the dealer for each individual product in the dealer's inventory, wherein the financial package is sorted to present to the customer for immediate purchase.

42. The method of claim 41, wherein the selectable criteria is selected from the group consisting of: cost; time in inventory; selling price; front-end profit; and back-end profit.

* * * * *